United States Patent
Seo et al.

(10) Patent No.: US 9,638,540 B2
(45) Date of Patent: May 2, 2017

(54) DEVICE AND METHOD FOR DISPLAYING A MAP ACCORDING TO THE GUIDING OF A NAVIGATION SYSTEM

(71) Applicant: Thinkware Systems Corporation, Gyeonggi-do (KR)

(72) Inventors: Jung Kak Seo, Seoul (KR); Sang Yong Moon, Seoul (KR); Keun Young Lee, Seoul (KR)

(73) Assignee: THINKWARE CORPORATION, Gyeonggi-Do (KR)

( * ) Notice: Subject to any disclaimer, the term of this patent is extended or adjusted under 35 U.S.C. 154(b) by 180 days.

(21) Appl. No.: 14/365,819

(22) PCT Filed: Dec. 14, 2012

(86) PCT No.: PCT/KR2012/010904
§ 371 (c)(1),
(2) Date: Jun. 16, 2014

(87) PCT Pub. No.: WO2013/089480
PCT Pub. Date: Jun. 20, 2013

(65) Prior Publication Data
US 2014/0354668 A1 Dec. 4, 2014

(30) Foreign Application Priority Data

Dec. 16, 2011 (KR) .......................... 10-2011-0136153
Jan. 19, 2012 (KR) .......................... 10-2012-0006377

(51) Int. Cl.
*G01C 21/36* (2006.01)
*G06T 19/00* (2011.01)
(Continued)

(52) U.S. Cl.
CPC ....... *G01C 21/367* (2013.01); *G01C 21/3638* (2013.01); *G06T 19/003* (2013.01);
(Continued)

(58) Field of Classification Search
None
See application file for complete search history.

(56) References Cited

U.S. PATENT DOCUMENTS

| 6,611,753 B1 | 8/2003 | Millington |
| 2006/0004516 A1* | 1/2006 | Imai ................... G01C 21/3697 701/431 |

FOREIGN PATENT DOCUMENTS

| JP | 2005-164693 A | 6/2005 |
| KR | 10-0944641 B1 | 3/2010 |

(Continued)

OTHER PUBLICATIONS

International Search Report in International Application No. PCT/KR2012/010904, filed Dec. 14, 2012.

*Primary Examiner* — Vu Nguyen
(74) *Attorney, Agent, or Firm* — Saliwanchik, Lloyd & Eisenschenk

(57) ABSTRACT

The present invention relates to a device and method for displaying a map according to the guiding of a navigation system. The device for displaying a map may include: a situation-identifying unit for identifying a situation requiring guiding through a map screen of a navigation system; a control parameter setting unit for setting, according to the identified situation, a control parameter that is a display requirement for the map screen; and a map indication control unit for indicating the map screen in a display mode that has applied the control parameter.

20 Claims, 6 Drawing Sheets

(51) Int. Cl.
    *G08G 1/0969* (2006.01)
    *G09B 29/00* (2006.01)
    *G09B 29/10* (2006.01)

(52) U.S. Cl.
    CPC ......... *G08G 1/0969* (2013.01); *G09B 29/005* (2013.01); *G09B 29/007* (2013.01); *G09B 29/10* (2013.01); *G06T 2215/16* (2013.01)

(56) References Cited

FOREIGN PATENT DOCUMENTS

| | | |
|---|---|---|
| KR | 10-2011-0015707 A | 2/2011 |
| KR | 10-2011-0086622 A | 7/2011 |
| KR | 10-2012-009730 A | 3/2012 |
| WO | WO2009119944 A1 * | 6/2008 |

\* cited by examiner

DEVICE AND METHOD FOR DISPLAYING A MAP ACCORDING TO THE GUIDING OF A NAVIGATION SYSTEM

CROSS-REFERENCE TO RELATED APPLICATIONS

This application is the U.S. national stage application of International Patent Application No. PCT/KR2012/010904, filed Dec. 14, 2012, which claims priority to Korean Application Nos. 10-2011-0136153, filed Dec. 16, 2011, and 10-2012-0006377, filed Jan. 19, 2012, the disclosures of each of which are incorporated herein by reference in their entirety.

TECHNICAL FIELD

Embodiments of the present invention relate to a device and method for providing a map screen to which a display mode suitable for a guide situation of a navigation system is applied.

RELATED ART

A navigation system refers to a system configured to provide a variety of drive-helpful information, such as informing a user about a current location of a vehicle, providing an optimal route to a desired destination of the user, and guiding the user along a route.

The navigation system receives propagation indicating, for example, latitude, longitude, and altitude, from a plurality of artificial satellites belonging to a global positioning system (GPS), calculates a current location of a moving object, and displays a map screen including the current location using pre-stored map data.

Currently, the navigation system has been evolved to provide a user with a further realistic display mode by three-dimensionally representing the map screen.

Korea Laid-Open Publication No. 10-2010-0005048, published on Jan. 13, 2010, discloses a technology for dynamically displaying navigation related information, such as a road name and guidance, along the roads displayed on a map screen so that a heading direction of a user may be intuitively verified.

Herein, proposed is a technology for defining a display mode of a map screen according to various guide situations of a navigation system and providing a map mode suitable for each situation.

DETAILED DESCRIPTION OF INVENTION

Subjects to be Solved

An embodiment of the present invention proposes a technology for configuring a variety of map screens based on variable guide elements, such as a road attribute, a road condition, and a driving state of a vehicle.

An embodiment of the present invention provides a device and method that may define a display mode of a map screen based on a guide situation of a navigation system and may provide a map screen suitable for each situation.

Solutions to be Carried Out

According to an aspect of the present invention, there is provided a map display device, including: a situation identifying unit configured to identify a guide situation that is guided through a map screen of a navigation system; a control parameter setting unit configured to set a control parameter that is a display requirement of the map screen according to the identified guide situation; and a map display control unit configured to display the map screen in a display mode in which the control parameter is applied.

According to an aspect, the guide situation may be classified based on at least one of a road attribute, a road condition, a guide point, and a driving state of a vehicle.

According to another aspect, the control parameter setting unit may set at least one control parameter among a rotation angle indicating a rotation level of a vertical axis with respect to the map screen, an elevation angle indicating an angle between the map screen and a camera, a distance between the vehicle and the camera, and whether to display an additional screen displayable on the map screen, based on the guide situation.

According to still another aspect, the map display control unit may switch a display mode of the map screen to any one display mode among a rotation view in which a heading direction of the vehicle is vertically observed from the sky, a bird view in which the heading direction of the vehicle is observed at a predetermined angle less than a vertical angle, and a driver's drive view in which the heading direction of the vehicle is observed from the front, and may apply the control parameter to the corresponding display mode.

According to still another aspect, when the guide situation corresponds to a situation in which a vehicle is driving on crossroads or a curved road having at least a predetermined curvature, the control parameter setting unit may set at least one of a rotation angle indicating a rotation level of a vertical axis with respect to the map screen and an elevation angle indicating an angle between the map screen and a camera, based on a distance between a turn point of the crossroads or the curved road and the vehicle or an angle formed with a heading direction of the vehicle based on the crossroads or the curved road.

According to still another aspect, when the guide situation corresponds to a situation in which a vehicle is driving on a highway, the control parameter setting unit may set an elevation angle indicating an angle between the map screen and a camera based on a location of the vehicle.

According to still another aspect, when the guide situation corresponds to a situation in which a vehicle is driving near at least one guide point of a departure, a destination, and a stop, the control parameter setting unit may set an elevation angle indicating an angle between the map screen and a camera based on a location of the vehicle.

According to still another aspect, the control parameter setting unit may set a distance value between the vehicle and the camera according to Equation 1.

$$d\_cam = d\_goal/(2*\tan(\theta)) \quad \text{[Equation 1]}$$

Here, d_cam denotes a distance between the vehicle and the camera, d_goal denotes a distance between the vehicle and the destination, and θ denotes the elevation angle.

According to still another aspect, when the guide situation corresponds to a situation in which a vehicle is driving on roads in which crossroads or a curved road having at least a predetermined curvature continues, the control parameter setting unit may set an elevation angle indicating an angle between the map screen and a camera based on a location of the vehicle.

According to still another aspect, the control parameter setting unit may set a distance value between the vehicle and the camera according to Equation 2.

$$d\_cam = d\_turn/(2*\tan(\theta)) \quad \text{[Equation 2]}$$

Here, d_cam denotes a distance between the vehicle and the camera, d_turn denotes a largest value among distances from the vehicle to a first turn point through an n-th turn point, and θ denotes the elevation angle.

According to still another aspect, when the guide situation corresponds to a situation in which a vehicle is driving on a ramp road, the control parameter setting unit may set an angle between a predetermined point ahead the vehicle and a heading direction of the vehicle as a rotation angle indicating a rotation level of a vertical axis with respect to the map screen.

According to still another aspect, when the guide situation corresponds to a situation in which a vehicle is driving on an uphill road, the control parameter setting unit may set an additional screen indicating a road condition ahead the uphill road to be displayed on the map screen.

According to another aspect of the present invention, there is provided a map display method, including: identifying a guide situation that is guided through a map screen of a navigation system; setting a control parameter that is a display requirement of the map screen according to the identified guide situation; and displaying the map screen in a display mode in which the control parameter is applied.

Effects of Invention

According to embodiments of the present invention, it is possible to provide an appropriate display environment by variously configuring a screen based on a guide situation of a navigation system without fixing a display mode of a map screen.

According to embodiments of the present invention, it is possible to enhance recognition about a guide situation and to provide a further accurate guide by determining a display mode of a map screen to be suitable for a guide situation of a navigation system and by differently determining a camera angle of the map screen, a distance between a vehicle and a camera, and whether to display an additional screen, based on the guide situation.

DETAILED DESCRIPTION OF DRAWINGS

BEST MODE

Hereinafter, embodiments of the present invention will be described with reference to the accompanying drawings.

The embodiments relate to a map display device and method that may display a map screen of a navigation system in an appropriate display mode suitable based on a guide situation.

A map display device and method according to an embodiment of the present invention may be applied to a navigation system. Also, the embodiments may be configured as an application exclusive for a mobile terminal, for example, a mobile navigation terminal, a smart phone, and a tablet.

A display mode of a map screen may be classified based on a view from which a heading direction of a vehicle is observed, for example, a "true north view" in which north is represented as above a screen, a "rotation view" in which the heading direction of the vehicle is represented as above a screen, and a "bird view" in which the heading direction of the vehicle appears to be observed from above by a bird in the sky.

Figure 1:
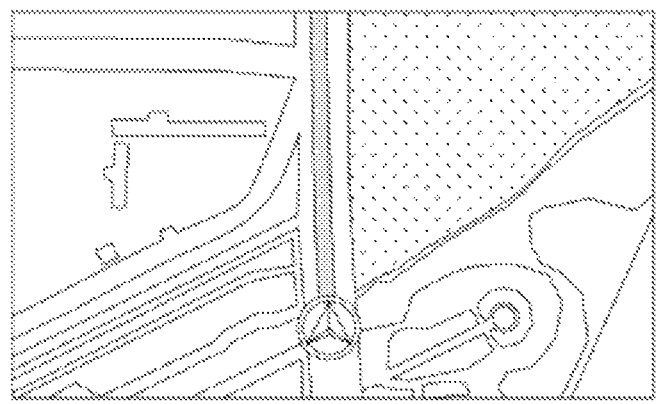
FIG. 1 illustrates an example of a map screen of a navigation system represented in a form of a rotation view.
Figure 2:
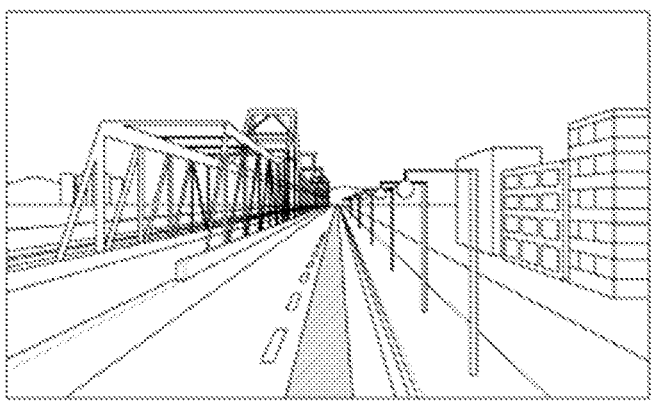
FIG. 2 illustrates an example of a map screen of a navigation system represented in a form of a drive view.
Figure 3:
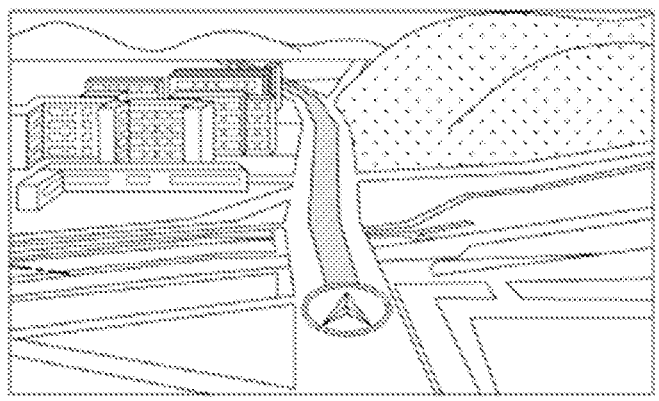
FIG. 3 illustrates an example of a map screen of a navigation system represented in a form of a bird view.

For example, FIG. 1 illustrates an example of a map screen based on a rotation view. The rotation view refers to a view in which a direction is vertically observed from the sky and thus, a direction of a map may rotate along a heading direction of a vehicle and thereby be guided. FIG. 2 illustrates an example of a map screen based on a drive view. In the drive view a heading direction of a vehicle is observed from the front along a view of a user and thus, a direction of a map may be guided as an image similar to the visual field of the user along the heading direction of the vehicle. FIG. 3 illustrates an example of a map screen based on a bird view. The bird view relates to a view in which a heading direction of a vehicle is observed at a predetermined angle less than a vertical angle from above and thereby, the heading direction of the vehicle may be guided. That is, the bird view corresponds to a mode for guiding the heading direction of the vehicle at the height of a bird's eye and thus, a direction of the vehicle as well as geographical features may be easily identified, that is, recognized.

The display mode may have advantages and disadvantages. In an existing navigation system, when a user selects a single display mode, a map screen may be fixed in the selected display mode.

To outperform the above constraints, the present embodiment proposes a technology for providing an appropriate display mode by variously configuring a screen based on a guide situation of a navigation system without fixing a display mode of a map screen.

The present embodiment defines a rotation angle and an elevation angle of a camera (view) as one of control parameters that are display requirements of a map screen in order to configure a screen based on a guide situation of a navigation system.

Figure 4:
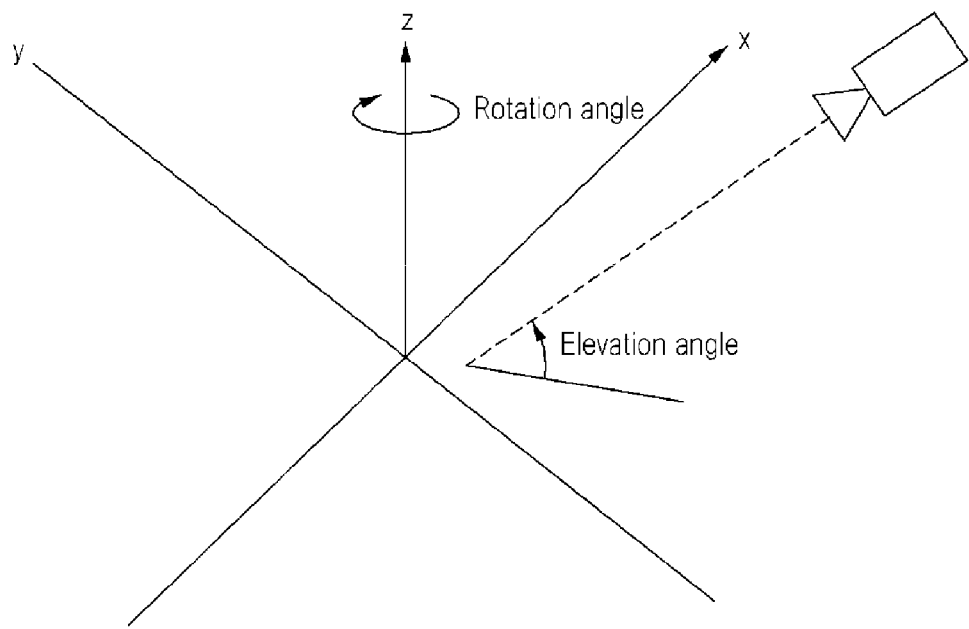
FIG. 4 illustrates an example of a rotation angle and an elevation angle of a camera according to an embodiment of the present invention.

FIG. 4 illustrates an example of a rotation angle and an elevation angle of a camera according to an embodiment of the present invention.

Referring to FIG. 4, when a map is defined as a plane including an x axis and a y axis, the term "rotation angle" used herein may indicate a rotation level of a vertical axis, z axis, with respect to a map plane. The term "elevation angle" used herein may indicate an angle between a camera and the plane map including the x axis and the y axis.

In the present embodiment, a guide situation of a navigation system may be classified and defined based on a variety of factors affecting a drive guide, for example, a road attribute, a road condition, a guide point, a driving state, and real-time traffic information. Here, the road attribute may refer to a type of road and thus, may indicate, for example, a highway, a general road, a ramp road, a narrow road, a road within complex, a tunnel, an overpass, and an underground road. The road condition may indicate, for example, a curvature that is a geographical element of road, an uphill road, and a downhill road. Also, the guide point may indicate a point of interest (POI) set by a user, for example, a departure, a destination, and a stop. The driving state may refer to a behavioral element when the user drives the vehicle and thus, may indicate, for example, a variable speed (acceleration) and a cruise driving speed.

For example, a "guide situation of a navigation system" may be classified into, for example, 1) a driving situation at a turn point, 2) a high speed driving situation on a highway, 3) a driving situation on a road within complex or a narrow road around a departure or a destination (hereinafter, a "driving situation around a destination/departure"), 4) a driving situation at continuous turn points, 5) a driving situation at a ramp point, 6) an uphill driving situation, and 7) a general driving situation.

Although the above situations are described hereinafter as examples of the guide situation of the navigation system, the present invention is not limited thereto and thus, the guide situation may be expanded to any situation based on various types of guide elements.

Figure 5:
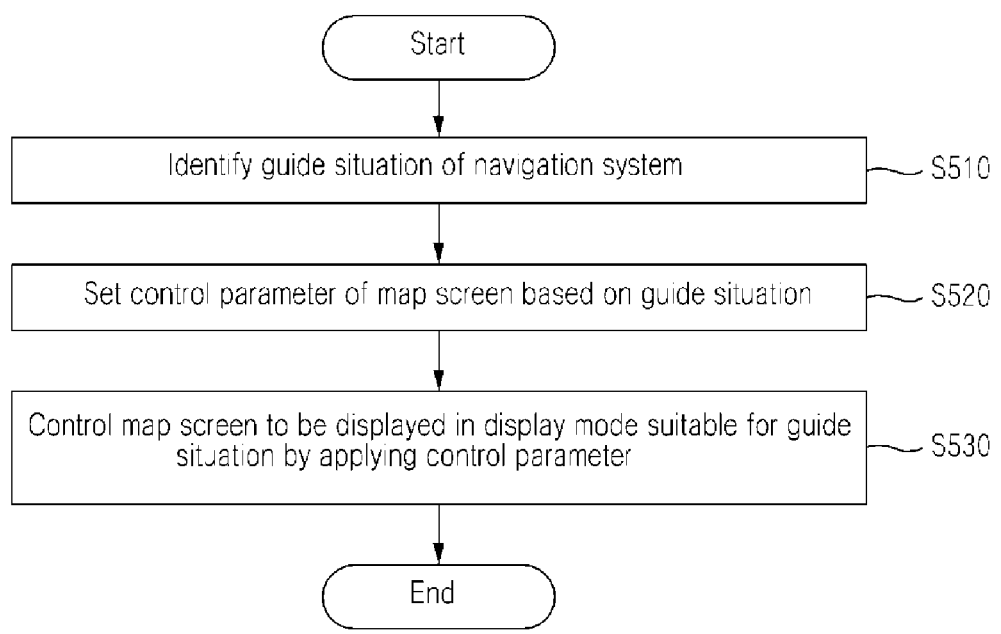
FIG. 5 is a flowchart illustrating a method of displaying a map based on a guide situation of a navigation system according to an embodiment of the present invention.

FIG. 5 is a flowchart illustrating a method of displaying a map based on a guide situation of a navigation system according to an embodiment of the present invention. The map display method may be performed by a map display device to be described below.

In operation S510, the map display device may identify a guide situation that is guided through a map screen of a navigation system. That is, the map display device may identify a situation corresponding to a current guide situation of the navigation system from among pre-defined situations by considering, for example, a road attribute and a road condition ahead a vehicle based on a current location of the vehicle, a guide point, a driving state of the vehicle, and real-time traffic information.

In operation S520, the map display device may set a control parameter that is a display requirement of the map screen based on the current guide situation of the navigation system. In the present embodiment, the control parameter may include at least one of a camera angle (rotation angle/elevation angle) of a map screen, a distance between the vehicle and the camera, and whether to display an additional screen. Here, the additional screen may refer to a map screen, for example, a minimap, a picture in picture (PIP) screen, and a dual-mode screen, in a form additionally displayable on a basic map screen about the current location. For example, the map display device may determine a rotation angle, an elevation angle, a distance between the vehicle and the camera, and whether to display the additional screen, based on a guide situation corresponding to the current guide situation of the navigation system among the aforementioned seven situations. Here, the rotation angle, the elevation angle, and a display mode, such as a rotation view, a bird view, and a drive view, may be predetermined for each guide situation and thereby be configured as a mapping table.

In operation S530, the map display device may control the map screen to be displayed in a display mode suitable for the corresponding guide situation by applying the control parameter set in operation S520 when displaying the map screen about the current guide situation of the navigation system. Here, the control parameter may include at least one of a camera angle (rotation angle/elevation angle) of a map screen, a distance between the vehicle and the camera, and whether to display an additional screen.

Hereinafter, a map display method according to each of the aforementioned seven situations will be described in detail.

1) Driving Situation at a Turn Point:

A turn point may indicate a point at which a vehicle turns on crossroads or a road having at least a predetermined curvature.

A map screen in a form of a rotation view corresponding to a display mode effective for recognizing a sense of distance may be appropriate for a user to more accurately recognize a turn location. However, in the rotation view, although a relatively wide map area may be represented in a heading direction of the vehicle, a route and roads present on the left and right after the turn point may not be accurately represented.

In the "driving situation at a turn point", modifying the rotation view form based on a distance between a corresponding road and a turn point and rotating a direction of a map to achieve a good view in a turn direction may allow the user to readily recognize a road in the heading direction of the vehicle.

Figure 6:
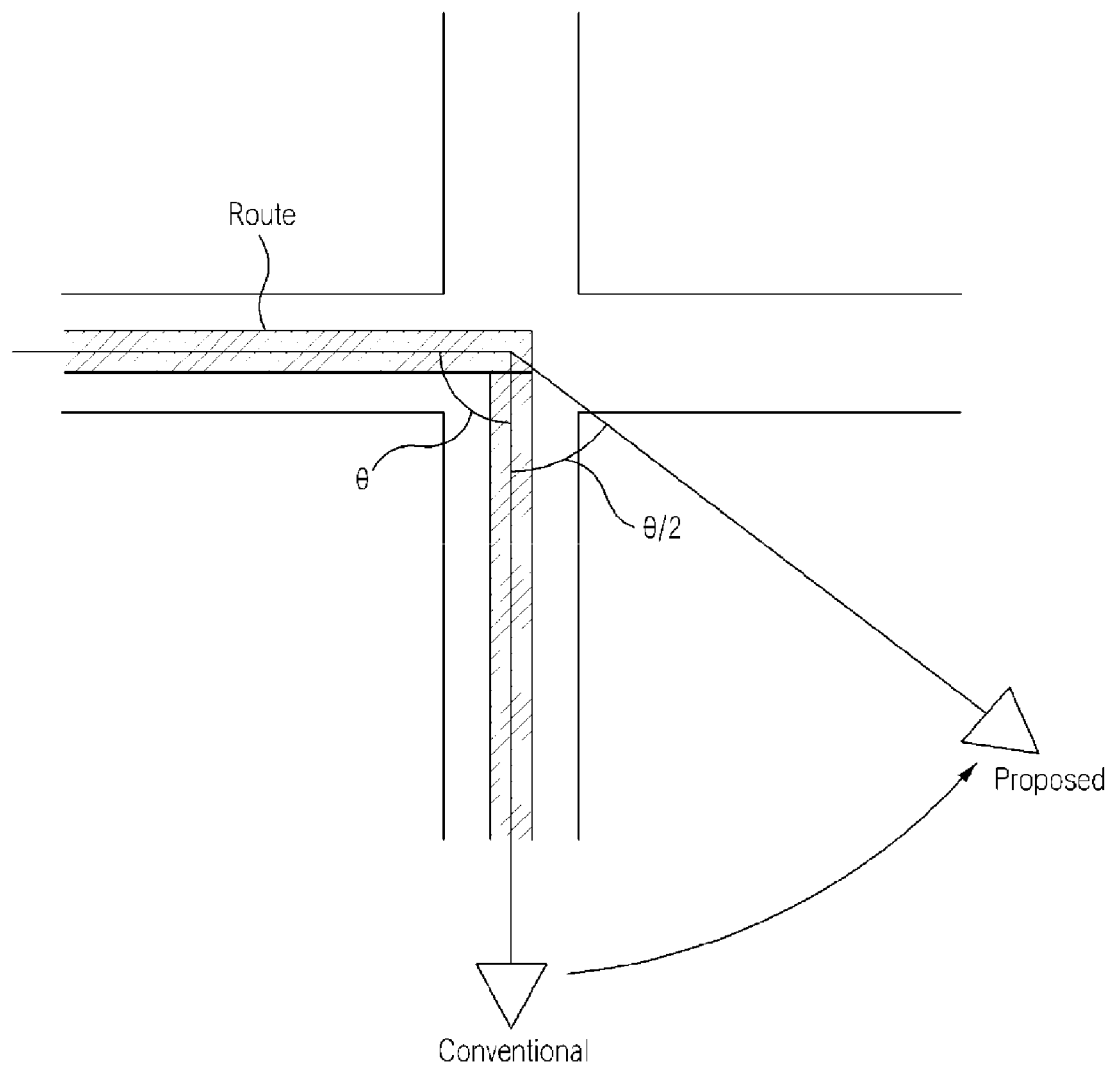
FIGS. 6 through 9 illustrate examples of describing a map display method for each guide situation.

For example, when a guide situation of a navigation system corresponds to the "driving state at a turn point", the map display device may switch a display mode of a map screen to a bird view and may designate an elevation angle of a camera to be 30 degrees in the bird view. As illustrated in FIG. 6, the map display device may designate a rotation angle of the camera to be ½ of an angle ($\theta$) formed with a heading direction of a route based on a turn point, that is, to be $\theta/2$. That is, in the "driving situation at a turn point", the map display device may display the map screen at an angle (rotation angle) from which a turn direction is easily observed compared to the related art.

The map display method according to the "driving situation at a turn point" may be applicable to all the roads irrespective of types of roads.

2) High Speed Driving Situation on a Highway:

In many cases, driving at a high speed on a highway may not require a separate guide during a relatively long period of time. Also, since points of interest (POIs), for example, facilities to be displayed on a map barely exist, the map may be configured as a monotonous screen.

In the "high speed driving situation on a highway", there is a need to emphasize an esthetic element by switching a bird view to a drive view, and to represent a sense of speed on a map screen by displaying a dynamic screen.

Figure 7:
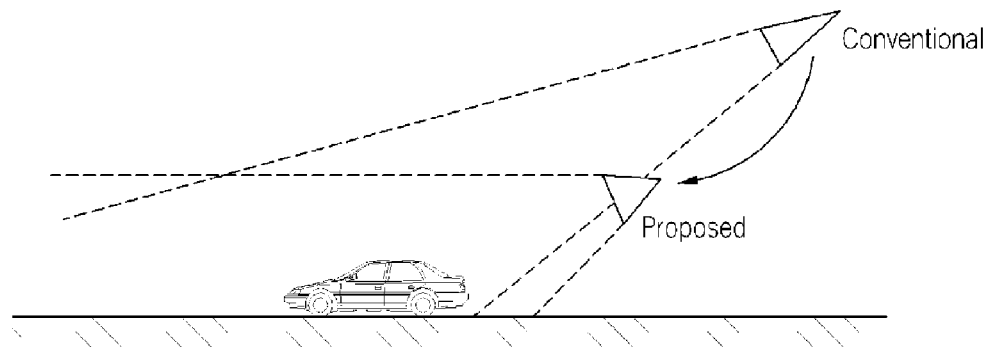

For example, referring to FIG. 7, when a guide situation of a navigation system corresponds to the "high speed driving situation on a highway", the map display device may represent an elevation angle of a camera as about 12 degrees at a point corresponding to about 25 mm at the back of a vehicle and about 65 m from above the vehicle. That is, as illustrated in FIG. 7, in the "high speed driving situation on a highway", the map display device may dynamically represent the map screen with a sense of speed by lowering the elevation angle of the camera compared to the related art.

The map display method according to the "high speed driving situation on a highway" may be applicable to, for example, a highway and an expressway.

3) Driving Situation around a Departure/Destination:

Location information around a departure is highly likely to be inaccurate. In addition, a departure/destination is highly likely to be an area around a road within complex or a narrow road.

In the "driving situation on a departure/destination", it is difficult to recognize a current location in a bird view and thus, displaying a map screen in a form of a rotation view may help recognizing a map compared to the bird view.

Figure 8:
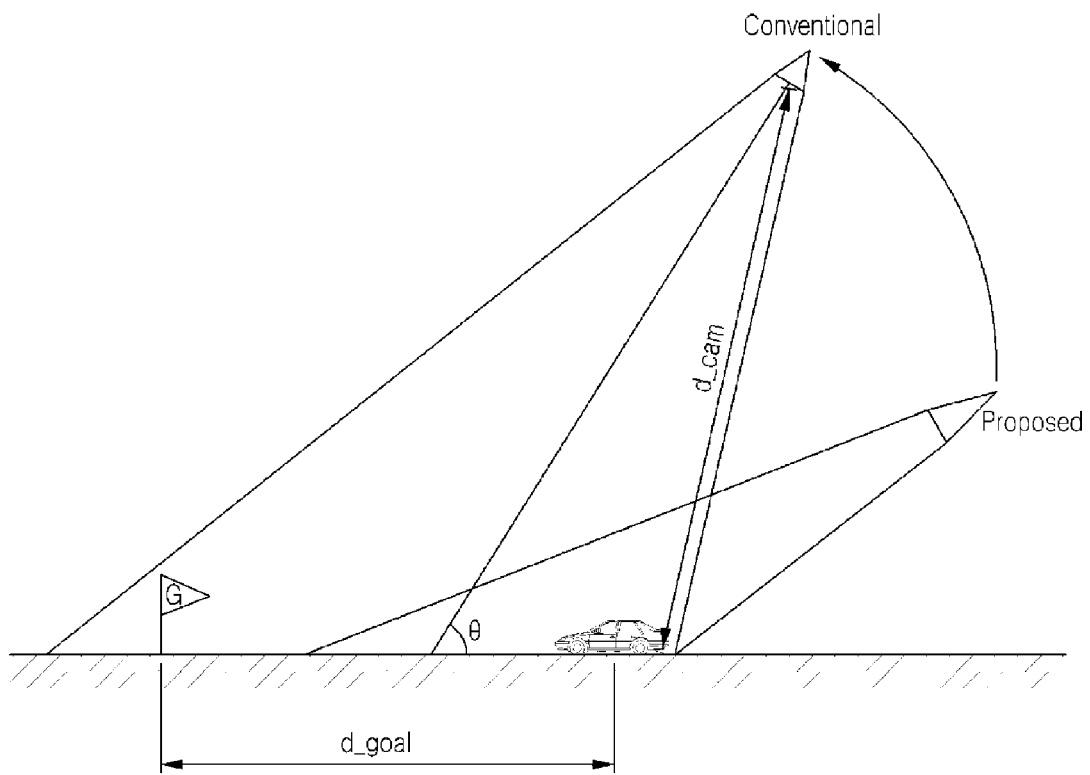

For example, when displaying a map screen indicating an area around a departure or a destination, the map display device may designate an elevation angle of a camera to be 70 degrees in a bird view. Also, as illustrated in FIG. 8, when being around a departure, the map display device may calculate a distance value (d_cam) between a vehicle and the camera and may apply the distance value to the corresponding map screen so that the vehicle and the destination may be simultaneously displayed.

The distance value (d_cam) between the vehicle and the camera may be calculated according to Equation 1.

$$d\_cam = d\_goal/(2*\tan(\theta)) \qquad \text{[Equation 1]}$$

In Equation 1, d_goal denotes a distance between the vehicle and the destination, and θ denotes the elevation angle. When θ is less than a field of view of the camera, the vehicle and the destination may be simultaneously displayed on the map screen.

When being around the departure, the map display device may maintain the map screen in the above form until the vehicle is deviated from a road within complex or a narrow road, or until the vehicle meets with a main road. When being around the destination, the map display device may configure the map screen so that the destination may be displayed on the map screen. That is, as illustrated in FIG. 8, in the "driving situation around a departure/destination", the map display device may display the map screen at an angle from which a guide point is easily observed by increasing the elevation angle of the camera compared to the related art.

The map display method according to the "driving situation around a departure/destination" may be applicable to, for example, a road within complex and a narrow road.

4) Driving Situation at Continuous Turn Points:

When another turn point is close after making a turn at crossroads or a road having at least a predetermined curvature, a map display method according to the related art may not readily recognize a subsequent turn after a first turn.

In the "driving situation at continuous turn points", when a distance between a turn point and a subsequent turn point is short, the map display device may configure a map screen so that the two turns points may be visibly displayed.

For example, when a guide situation of a navigation system corresponds to the "driving situation at continuous turn points", the map display device may switch a display mode of a map screen to a bird view, and may designate an elevation angle of a camera to be 70 degrees in the bird view. Here, the map display device may calculate a distance value (d_cam) between a vehicle and the camera and may apply the distance value to the corresponding map screen so that the vehicle and the continuous two turn points may be simultaneously displayed to be visible on the map screen.

The distance value (d_cam) between the vehicle and the camera may be calculated according to Equation 2.

$$d\_cam = d\_turn/(2*\tan(\theta)) \qquad \text{[Equation 2]}$$

In Equation 2, d_turn denotes a largest value between a distance (d_turn1) from the vehicle to a first turn and a distance (d_turn2) from the vehicle to a second turn, and θ denotes an elevation angle. Here, when θ is less than a field of view of the camera, the vehicle and the continuous two turn points may be simultaneously displayed on the map screen.

The map display method according to the "driving situation at continuous turn points" may be applicable to all the roads irrespective of a type of road.

5) Driving Situation at a Ramp Point:

In many cases, a ram road has a relatively great curvature and thus, a very short road portion may be substantially displayed on a map screen. This limit still exists although a display mode of the map screen is switched to a rotation view.

When a guide situation of a navigation system corresponds to the "driving situation at a ramp point", the map display device may adjust a scale and a direction and thereby configure the map screen so that a more road portion may be displayed on the map screen.

Figure 9:
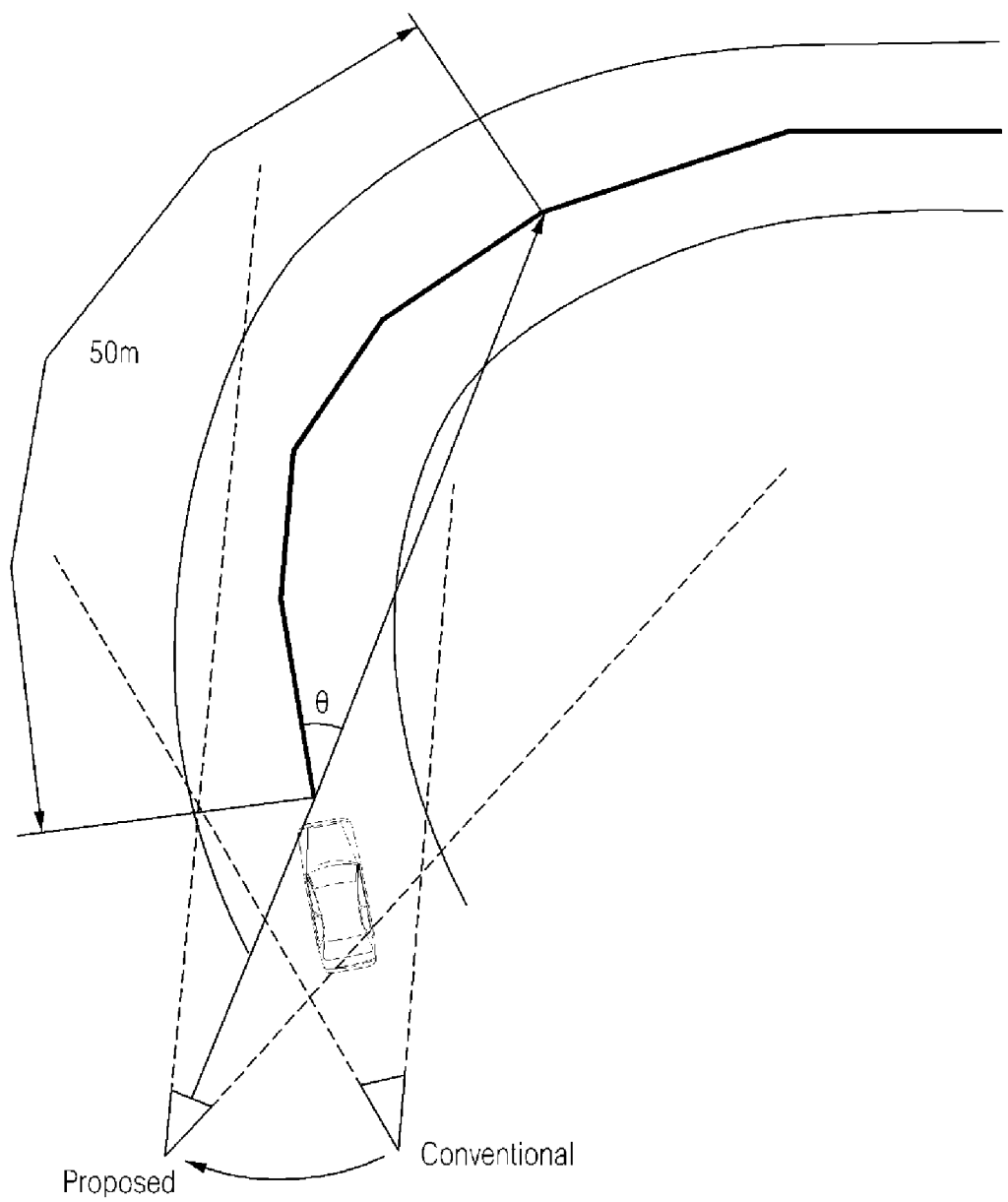

For example, referring to FIG. 9, the map display device may designate a rotation angle of a camera to be an angle θ between a road link 50 m point ahead a vehicle and a heading direction of a route. That is, in the "driving situation at a ramp point", the map display device may represent the map screen at an angle (rotation angle) from which the heading direction may be easily observed on a road having a relatively great curvature.

That is, as illustrated in FIG. 9, in the "driving situation at a ramp point", the map display device may adjust a camera scale toward a link ahead the vehicle and thereby configure the map screen so that a more road portion to be substantially displayed on the map screen may be easily observed.

The map display method according to the "driving situation at a ramp point" may be applicable to a ramp road.

6) Uphill Driving Situation:

In the case of driving on an uphill road, it is difficult to recognize a road condition over the uphill and thus, a driving guide may become an issue.

When a guide situation of a navigation system corresponds to the "uphill driving situation", the map display device may represent a map screen about a corresponding location in a minimap form so that a road condition over the uphill may be recognized in advance. That is, in the "uphill driving situation", the map display device may display a minimap representing a map about the road over the uphill, that is, the road ahead on a basic map screen about a current location.

The map display method according to the "uphill driving situation" may be applicable to all the roads irrespective of a type of road.

7) General Driving Situation:

The general driving situation may indicate a situation of guiding a section in which a predetermined guide event is absent, and may correspond to a guide situation excluding the aforementioned six situations.

In the "general driving situation", three-dimensionally displaying a remote place may secure the road visibility and may decrease a stifling feeling. For example, when a guide situation of a navigation system corresponds to the "general driving situation", the map display device may display a map screen in a display mode of a bird view form.

The aforementioned guide situations may overlap. When a plurality of guide situations overlaps at a time, the following priority may be applied as expressed by Table 1.

TABLE 1

| Priority | Guide situation |
| --- | --- |
| 1 | Driving situation around a departure/destination |
| 2 | Driving situation at continuous turn points |

TABLE 1-continued

| Priority | Guide situation |
|---|---|
| 3 | Driving situation at a turn point |
| 4 | Driving situation at a ramp point |
| 5 | High speed driving situation on a highway |
| 6 | Uphill driving situation |
| 7 | General driving situation |

The map display method according to an embodiment may display a map screen in an appropriate display mode based on a guide situation of a navigation system.

Figure 10:
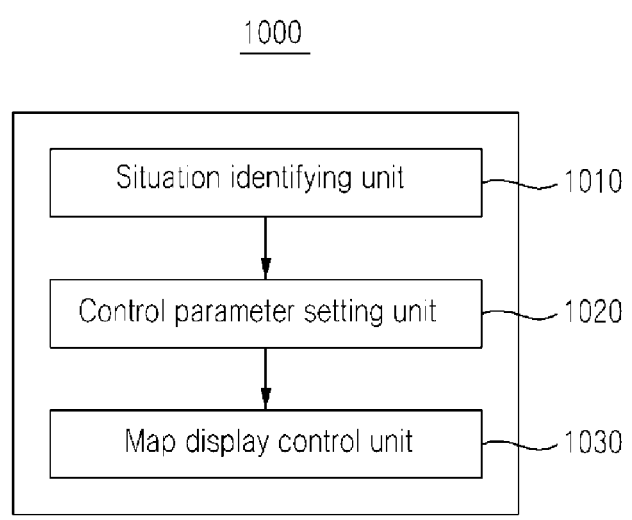
FIG. 10 is a block diagram illustrating a configuration of a device for displaying a map based on a guide situation of a navigation system according to an embodiment of the present invention.

FIG. 10 is a block diagram illustrating a device for displaying a map based on a guide situation of a navigation system according to an embodiment of the present invention.

Referring to FIG. 10, a map display device 1000 according to an embodiment may include a situation identifying unit 1010, a control parameter setting unit 1020, and a map display control unit 1030.

The situation identifying unit 1010 may identify a guide situation that is guided through a map screen of a navigation system. Here, the guide situation may be classified and defined into a plurality of situations based on at least one of a road attribute, a road condition, a guide point, a driving state of a vehicle, and real-time traffic information. For example, the situation identifying unit 1010 may identify a situation corresponding to a current guide situation of the navigation system from among pre-defined situations by considering, for example, a road attribute and a road condition ahead the vehicle based on a current location of the vehicle, a guide point, a driving state of the vehicle, and real-time traffic information. Here, when a plurality of situations overlaps at a time, the situation identifying unit 1010 may determine a situation corresponding to a relatively high priority as a current guide situation based on the priority expressed in Table 1.

The control parameter setting unit 1020 may set a control parameter corresponding to a display requirement of the map screen based on the current guide situation of the navigation system. Here, the control parameter setting unit 1020 may set, as the control parameter, at least one of a rotation angle indicating a rotation level of a vertical axis with respect to the map screen, an elevation angle indicating an angle between the map screen and a camera, a distance between the vehicle and the camera, and whether to display an additional screen displayable on the map screen.

As an example, when a guide situation of a navigation system corresponds to a situation in which a vehicle is driving on crossroads or a curved road having at least a predetermined curvature, the control parameter setting unit 1020 may set at least one of a rotation angle and an elevation angle based on a distance between a turn point of the crossroads or the curved road and the vehicle or an angle formed with a heading direction of the vehicle based on the crossroads or the curved road. As another example, when a guide situation of a navigation system corresponds to a situation in which a vehicle is driving on a highway, the control parameter setting unit 1020 may set the elevation angle based on a location of the vehicle to display a screen on which a sense of speed is sufficiently represented. As another example, when a guide situation of a navigation system corresponds to a situation in which a vehicle is driving near at least one guide point of a departure, a destination, and a stop, the control parameter setting unit 1020 may set an elevation angle based on a location of the vehicle. In this example, the control parameter setting unit 1020 may set a distance between the vehicle and the camera based on a distance between the vehicle and the destination and the preset elevation. As another example, when a guide situation of a navigation system corresponds to a situation in which a vehicle is driving on roads in which crossroads or a curved road having at least a predetermined curvature continues, the control parameter setting unit 1020 may set an elevation angle based on a location of the vehicle, so that continuous turn points may be simultaneously displayed on a single screen.

In this example, the control parameter setting unit 1020 may set the distance between the vehicle and the camera based on a largest value among distances from the vehicle to a first turn point through an n-th turn point and the preset elevation angle. As another example, when a guide situation of a navigation system corresponds to a situation in which a vehicle is driving on a ramp road, the control parameter setting unit 1020 may set an angle between a predetermined point ahead the vehicle and a heading direction of the vehicle as a rotation angle of the camera, so that more routes may be displayed on the map screen. As another example, when a guide situation of a navigation system corresponds to a situation in which a vehicle is driving on an uphill road, the control parameter setting unit 1020 may set an additional screen indicating a road condition ahead the uphill road to display a screen that enables a user to recognize a road condition over the uphill in advance.

The map display control unit 1030 may display a map screen in a display mode suitable for the guide situation of the navigation system. For example, the map display control unit 1030 may switch a display mode of the map screen to any one display mode among a rotation view, a bird view, and a drive view, and may apply the set control parameter to the corresponding display mode. That is, when displaying the map screen on a navigation terminal, the map display control unit 1030 may configure the map screen in a display mode suitable for a current guide situation by applying at least one of a camera angle (rotation angle/elevation angle), a distance between the vehicle and the camera, and whether to display an additional screen based on the current guide situation.

As described above, according to embodiments of the present invention, it is possible to provide an appropriate display environment by variously configuring a screen based on a guide situation of a navigation system without fixing a display mode of a map screen. That is, it is possible to enhance recognition about a guide situation and to provide a further accurate guide by determining a display mode of a map screen to be suitable for a guide situation of a navigation system and by differently determining a camera angle of the map screen, a distance between a vehicle and a camera, and whether to display an additional screen based on the guide situation.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A map display device, comprising:
a processor including,
a situation identifying unit configured to identify a guide situation that is guided through a map screen of a navigation system;
a control parameter setting unit configured to set a control parameter that is a display requirement of the map screen according to the identified guide situation; and
a map display control unit configured to display the map screen in a display mode in which the control parameter is applied,
wherein the control parameter setting unit is configured to set a value of distance (d_cam) between a vehicle and a camera based on both a distance (d_goal) between the vehicle and a predetermined location and an elevation angle (θ) indicating an angle between the map screen and the camera based on a location of the vehicle, and wherein d_cam is proportional to d_goal/tan(θ).

2. The map display device of claim 1, wherein the guide situation is classified based on at least one of a road attribute, a road condition, a guide point, and a driving state of the vehicle.

3. The map display device of claim 1, wherein the control parameter setting unit is configured to set at least one control parameter among a rotation angle indicating a rotation level of a vertical axis with respect to the map screen, the elevation angle, a distance between the vehicle and the camera, and whether to display an additional screen displayable on the map screen, based on the guide situation.

4. The map display device of claim 3, wherein the map display control unit is configured to switch a display mode of the map screen to any one display mode among a rotation view in which a heading direction of the vehicle is vertically observed from the sky, a bird view in which the heading direction of the vehicle is observed at a predetermined angle smaller than a right angle, and a driver's drive view in which the heading direction of the vehicle is observed from the front, and to apply the control parameter to the corresponding display mode.

5. The map display device of claim 1, wherein when the guide situation corresponds to a situation in which a vehicle is driven on crossroads or a curved road having at least one predetermined curvature, the control parameter setting unit is configured to set at least one of a rotation angle indicating a rotation level of a vertical axis with respect to the map screen and the elevation angle, based on a distance between a turn point of the crossroads or the curved road and the vehicle, or based on an angle formed with a heading direction of the vehicle based on the crossroads or the curved road.

6. The map display device of claim 1, wherein when the guide situation corresponds to a situation in which a vehicle is driven on a highway, the control parameter setting unit is configured to set the elevation angle.

7. The map display device of claim 1, wherein when the guide situation corresponds to a situation in which a vehicle is driven near at least one guide point of a departure, a destination, and a stop, the control parameter setting unit is configured to set the elevation angle.

8. The map display device of claim 7, wherein the control parameter setting unit is configured to set the value of distance between the vehicle and the camera according to Equation 1:

$$d\_cam = d\_goal/(2*\tan(\theta)) \quad \text{[Equation 1]}$$

where d_cam denotes the distance between the vehicle and the camera, d_goal denotes a distance between the vehicle and the destination, and θ denotes the elevation angle.

9. The map display device of claim 1, wherein when the guide situation corresponds to a situation in which a vehicle is driven on roads in which crossroads or a curved road having at least one predetermined continuous curvature, the control parameter setting unit is configured to set the elevation angle.

10. The map display device of claim 9, wherein the control parameter setting unit is configured to set the value of distance between the vehicle and the camera according to Equation 2:

$$d\_cam = d\_turn/(2*\tan(\theta)) \quad \text{[Equation 2]}$$

where d_cam denotes the distance between the vehicle and the camera, d_turn denotes a largest value among distances between the vehicle and n turn points where n is an integer greater than zero, and θ denotes the elevation angle.

11. The map display device of claim 1, wherein when the guide situation corresponds to a situation in which a vehicle is driven on a ramp road, the control parameter setting unit is configured to set an angle between a predetermined point ahead of the vehicle and a heading direction of the vehicle as a rotation angle indicating a rotation level of a vertical axis with respect to the map screen.

12. The map display device of claim 1, wherein when the guide situation corresponds to a situation in which a vehicle is driven on an uphill road, the control parameter setting unit is configured to set an additional screen indicating a road condition ahead to be displayed on the map screen.

13. A map display method, comprising:
identifying a guide situation that is guided through a map screen of a navigation system;
setting a control parameter that is a display requirement of the map screen according to the identified guide situation; and
displaying the map screen in a display mode in which the control parameter is applied,
wherein the setting of the control parameter comprises setting a value of distance (d_cam) between a vehicle and a camera based on both a distance (d_goal) between the vehicle and a predetermined location and an elevation angle indicating an angle (θ) between the map screen and the camera based on a location of the vehicle, and
wherein d_cam is proportional to d_goal/tan(θ).

14. The method of claim 13, wherein the guide situation is classified based on at least one of a road attribute, a road condition, a guide point, and a driving state of the vehicle.

15. The method of claim 13, wherein the setting of the control parameter comprises setting at least one control parameter among a rotation angle indicating a rotation level of a vertical axis with respect to the map screen, the elevation angle, a distance between the vehicle and the camera, and whether to display an additional screen displayable on the map screen, based on the guide situation.

16. The method of claim 15, wherein the displaying of the map screen comprises switching a display mode of the map screen to any one display mode among a rotation view in which a heading direction of the vehicle is vertically observed from the sky, a bird view in which the heading direction of the vehicle is observed at a predetermined angle smaller than a right angle, and a driver's drive view in which the heading direction of the vehicle is observed from the front, and applying the control parameter to the corresponding display mode.

17. The method of claim 13, wherein the setting of the control parameter comprises setting at least one of a rotation angle indicating a rotation level of a vertical axis with respect to the map screen and the elevation angle based on a distance between a turn point of crossroads or a curved road and a vehicle or based on an angle formed with a heading direction of the vehicle based on the crossroads or the curved road, when the guide situation corresponds to a situation in which the vehicle is driven on the crossroads or the curved road having at least one predetermined curvature.

18. The method of claim 13, wherein the setting of the control parameter comprises setting the elevation angle based on a location of the vehicle when the guide situation corresponds to a situation in which the vehicle is driven near at least one guide point of a departure, a destination, and a stop.

19. The method of claim 18, wherein the setting of the control parameter comprises setting the value of distance between the vehicle and the camera according to Equation 3:

$$d\_cam = d\_goal/(2*\tan(\theta)) \quad \text{[Equation 3]}$$

where d_cam denotes the distance between the vehicle and the camera, d_goal denotes a distance between the vehicle and the destination, and θ denotes the elevation angle.

20. Non-transitory computer-readable media storing a program to implement the method according to claim 13.

* * * * *